US011955098B2

(12) United States Patent
Luo et al.

(10) Patent No.: US 11,955,098 B2
(45) Date of Patent: Apr. 9, 2024

(54) DETERMINING COMPENSATION VALUE

(71) Applicant: TCL COMMUNICATION (NINGBO) CO., LTD., Zhejiang (CN)

(72) Inventors: Guangyue Luo, Zhejiang (CN); Jie Liu, Zhejiang (CN); Jianying Yang, Zhejiang (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 0 days.

(21) Appl. No.: 18/305,061

(22) Filed: Apr. 21, 2023

(65) Prior Publication Data

US 2023/0252954 A1 Aug. 10, 2023

Related U.S. Application Data

(63) Continuation-in-part of application No. PCT/CN2020/134969, filed on Dec. 9, 2020.

(30) Foreign Application Priority Data

Oct. 22, 2020 (CN) ......................... 202011142000.7

(51) Int. Cl.
*G09G 3/20* (2006.01)
*G09G 5/00* (2006.01)

(52) U.S. Cl.
CPC ..... *G09G 5/003* (2013.01); *G09G 2320/0242* (2013.01); *G09G 2340/06* (2013.01)

(58) Field of Classification Search
None
See application file for complete search history.

(56) References Cited

U.S. PATENT DOCUMENTS

2017/0076654 A1* 3/2017 Wang .................. G09G 3/2074
2019/0056271 A1 2/2019 Ishii

FOREIGN PATENT DOCUMENTS

CN 107564470 A 1/2018
CN 108648679 A 10/2018

(Continued)

OTHER PUBLICATIONS

Written Opinion of the International Search Authority in international application No. PCT/CN2020/134969, dated Jul. 21, 2021.

(Continued)

*Primary Examiner* — Carl Adams
(74) *Attorney, Agent, or Firm* — PV IP PC; Zhigang Ma; Wei Te Chung

(57) ABSTRACT

A method for determining a compensation value for a local display region, a screen display method, and a terminal device are disclosed. The method for determining a compensation value includes turning on the screen to be compensated, wherein the screen to be compensated includes an aperture region and a non-aperture region; obtaining a first display data of the aperture region and a second display data of the non-aperture region when the screen to be compensated is turned on; determining display ratio between the aperture region and the non-aperture region, based on the first display data and the second display data; and calculating a compensation value for performing display compensation on the aperture region based on the display ratio.

15 Claims, 3 Drawing Sheets

(56) References Cited

FOREIGN PATENT DOCUMENTS

| | | | |
|---|---|---|---|
| CN | 108766347 | A | 11/2018 |
| CN | 110010666 | A | 7/2019 |
| CN | 110275358 | A | 9/2019 |
| CN | 110460825 | A | 11/2019 |
| CN | 110706634 | A | 1/2020 |
| CN | 111372002 | A | 7/2020 |

OTHER PUBLICATIONS

International Search Report in International application No. PCT/CN2020/134969, dated Jul. 21, 2021.
Chinese Office Action issued in corresponding Chinese Patent Application No. 202011142000.7 dated Aug. 18, 2021, pp. 1-8.

* cited by examiner

DETERMINING COMPENSATION VALUE

CROSS-REFERENCE TO RELATED APPLICATIONS

This application a continuation of International Application No. PCT/CN2020/134969, filed on Dec. 9, 2020, which claims priority to Chinese Patent Application No. 202011142000.7, entitled "Method And Apparatus For Determining Compensation Value for Local Display Region, Storage Medium, And Terminal Device", filed on Oct. 22, 2020, the disclosures of which are hereby incorporated by reference in their entities.

TECHNICAL FIELD

The present disclosure relates to communication technology, and more particularly, to a method for determining a compensation value for a local display region, a screen display method, and a terminal device.

BACKGROUND

With the development of terminal, an under-screen camera appears. The under-screen camera is a camera formed by reducing a pixel density of a screen region over the camera to improve transmittance of the screen region, which does not require a hole for mounting the camera in the screen.

However, since the pixel density of the screen region over the camera is lower, an effective display pixel area of the screen region will be reduced, thereby causing a significant display effect difference between the screen region and other screen regions.

SUMMARY

In view of the above, an embodiment of the present disclosure provides a method for determining a compensation value for a local display region, wherein the method is applied to a terminal device equipped with a screen to be compensated, and comprises:

- turning on the screen to be compensated, wherein the screen to be compensated includes an aperture region and a non-aperture region;
- obtaining a first display data of the aperture region and a second display data of the non-aperture region when the screen to be compensated is turned on;
- determining a display ratio between the aperture region and the non-aperture region, based on the first display data and the second display data; and
- calculating a compensation value for performing display compensation on the aperture region based on the display ratio.

An embodiment of the present disclosure provide a screen display method applied to a terminal device comprising a screen to be compensated, the screen display method comprising:

- turning on the screen to be compensated, wherein the screen to be compensated includes an aperture region and a non-aperture region;
- obtaining a first display data of the aperture region and a second display data of the non-aperture region during the screen to be compensated is turned on;
- determining display ratio between the aperture region and the non-aperture region, based on the first display data and the second display data;
- calculating a compensation value for performing display compensation on the aperture region based on the display ratio;
- when the screen of the terminal device is initialized, obtaining the compensation value for compensating for display of the aperture region in the screen; and
- obtaining current display data of the aperture region; and
- performing display compensation on the current display data of the aperture region based on the compensation value, to perform screen display.

An embodiment of the present disclosure provides a terminal, comprising a processor and a memory electrically connected to the processor and storing thereon an instruction and data executable by the processor to perform operations in the method for determining a compensation value for a local display region or the screen display method described in any one of the above.

DETAILED DESCRIPTION

Figure 1:
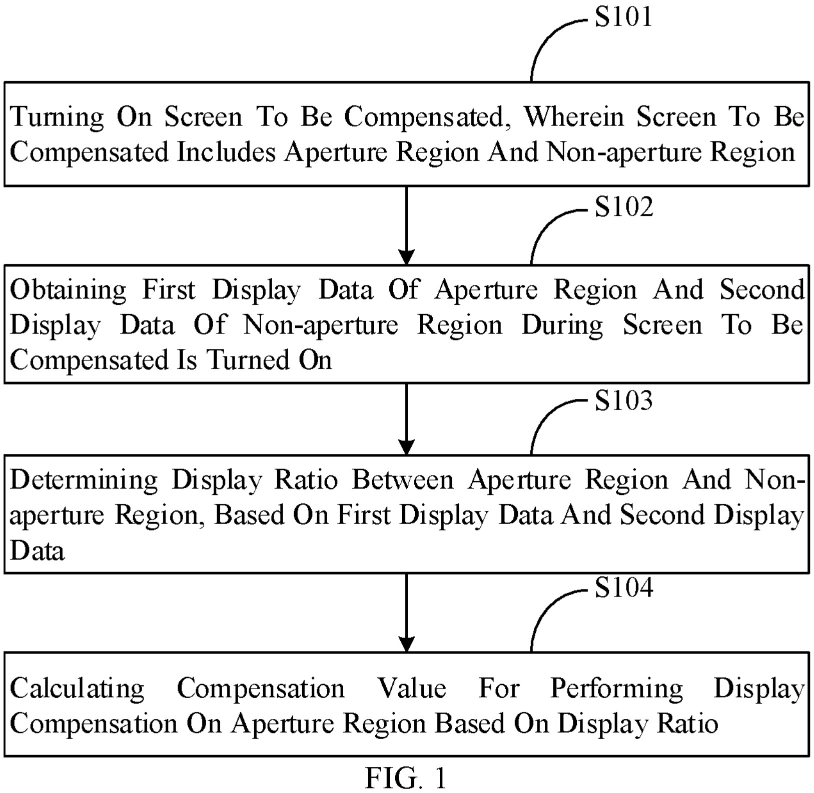
FIG. 1 is a flowchart of a method for determining a compensation value for a local display region according to an embodiment of the present disclosure.

Technical solutions in embodiments of the present disclosure will be clearly and completely described below in conjunction with accompanying drawings in the embodiments of the present disclosure. It will be apparent that the embodiments described are merely part of, but not all of, the embodiments of the present disclosure. In the figures, elements with similar structure are denoted by a same reference numeral. According to the embodiments of the present application, all other embodiments obtained by those skilled in the art without creative work fall within the protection scope of the present disclosure.

In the description of the present disclosure, it is to be understood that the term "first", "second", or the like are for purposes for description only and are not to be construed as indicating or imposing a relative importance or implicitly indicating the number of technical features indicated. Thus, a feature that limited by "first", "second", or the like may expressly or implicitly include one or more of the features. In the description of the present disclosure, the meaning of "a/the plurality of" is two or more, unless otherwise specifically defined.

Embodiments of the present disclosure are directed to a method and an apparatus for determining a local display region compensation value, a storage medium, and a terminal device.

Referring to FIG. 1 illustrating a flowchart of a method for determining a compensation value for a local display region according to an embodiment of the present disclosure, the method for determining a compensation value for a local display region is applied to a terminal device in which a screen to be compensated is installed. The terminal device may be any smart electronic device having a mobile communication function, such as a smartphone, a tablet computer, or a smart watch. As shown in FIG. 1, the method for determining a compensation value for the local display region according to an embodiment of the present disclosure includes Steps S101 to S104, which are described as follows.

At Step S101, a screen to be compensated is turned on, and the screen to be compensated includes an aperture region and a non-aperture region.

Figure 2:
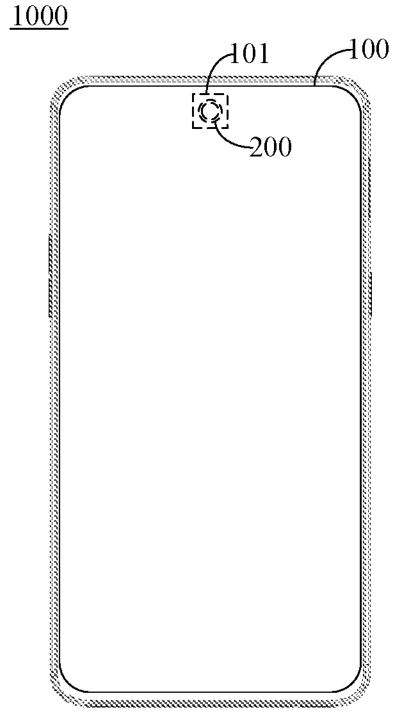
FIG. 2 is a block diagram of a terminal device according to a first embodiment of the present disclosure.

Referring to FIG. 2, which is a block diagram of a terminal device according to a first embodiment of the present disclosure. A screen 100 to be compensated is installed in a terminal device 1000, and an under-screen camera 200 is disposed below the screen 100 to be compensated. Currently, the under-screen camera is generally formed by reducing pixel density of a screen region over the under-screen camera, thereby improving transmittance of the screen region. As shown in FIG. 2, an aperture region 101 is an area of the screen that directly faces the under-screen camera 200 in a thickness direction of the terminal device and can surround the under-screen camera 200 in a plan view of the terminal device, and regions other than the aperture region 101 is a non-aperture region. Due to the difference in pixel density, there is a certain display difference between the aperture region 101 and the non-aperture region during a display period of the terminal device. Therefore, compensation for the display difference is required. It should be noted that the shape of the aperture region 101 may be any shape suitable for the shape of the under-screen camera, which is not limited in the present application.

In an embodiment of the present disclosure, Step S101 includes turning on the screen to be compensated, and displaying a same content in both the aperture region and the non-aperture region. For example, both the aperture region and the non-aperture region display a pure color. In this way, the subsequent step of determining display ratio between the aperture region and the non-aperture region and calculating the compensation value may be made more accurate without being disturbed by the difference in the display content.

At Step S102, a first display data of the aperture region and a second display data of the non-aperture region when the screen to be compensated is turned on are obtained.

In some embodiments, Step S102 may include:

obtaining image data respectively displayed in the aperture region and the non-aperture region, wherein the image data in represented in an RGB color space, that is, represented by three primary color components of red, green, or blue; and converting the image data in the RGB color space to display data in the Lxy color space or the Luv color space.

Specifically, the present disclosure is described by using the display data in the Lxy color space as an example. First, the obtained image data may be converted from the RGB color space to the XYZ color space, and then from the XYZ color space to the Lxy color space. Since the RGB color space, the XYZ color space, and the Lxy color space are all well-known color spaces, the conversion formula between the RGB color space, the XYZ color space, and the Lxy color space is a well-known technique, and details are not described herein.

At Step S103, based on the first display data and the second display data, display ratio between the aperture region and the non-aperture region is determined.

The display data in the Lxy color space includes luminance L and chromaticity coordinates (x, y). Therefore, in an embodiment, the first display data includes a first luminance value L1 and a first chromaticity coordinate (x1, y1), and the second display data includes a second luminance value L2 and a second chromaticity coordinate (x2, y2). Step S103 may include Substep 1-1 and Substep 1-2.

At Substep 1-1, based on the second luminance value and the first luminance value, a luminance ratio of the non-aperture region to the aperture region when the screen to be compensated is turned on is determined.

In an embodiment, the luminance ratio of the non-aperture region to the aperture region is identified in a linear relationship, that is, a L1=L2. Substep 1-1 may include: dividing the first luminance value L1 by the second luminance value L2 to obtain the luminance ratio of the non-aperture region to the aperture region.

At Substep 1-2, based on the first chromaticity coordinate and the second chromaticity coordinate, a chromaticity ratio of the non-aperture region to the aperture region when the screen to be compensated is turned on is determined.

The chromaticity ratio of the non-aperture region to the aperture region may be obtained by the equation $\sqrt{(x_1-x_2)^2+(y_1-y_2)^2}$.

At Step S104, based on the display ratio, a compensation value for performing display compensation on the aperture region is calculated.

In an embodiment, Step S104 may include Substep 2-1 to Substep 2-4:

At Substep 2-1, It is determined whether the luminance ratio is smaller than a preset luminance ratio.

The preset luminance ratio is a critical value for determining whether the difference between the displayed luminance of the aperture region and the displayed luminance of the non-aperture region is obvious, and is affected by the type of the screen to be compensated and the pixel density. Therefore, the present disclosure is not limited thereto. It will be readily appreciated that if the luminance ratio is less than the preset luminance ratio, it may be considered that the luminance difference between the aperture region and the non-aperture region is not obvious, that is, visual difference between the aperture region and the non-aperture region cannot be perceived by naked eyes. Therefore, there is no need to compensate the luminance data of the aperture region. If the luminance ratio is not less than the preset luminance ratio, it is considered that there is an obvious luminance difference between the aperture region and the non-aperture region, that is, the visual difference between the aperture region and the non-aperture region may be obviously perceived by the naked eye, so that the luminance data of the aperture region needs to be compensated.

At Substep 2-2, If the luminance ratio is not less than the preset luminance ratio, the luminance ratio is logarithmically calculated according to the preset logarithmic function to obtain a luminance compensation value.

The luminance compensation value is a compensation value for the red component in the image data.

The preset logarithmic function is a logarithmic function for converting the display data from the RGB color space to the Lxy color space, and is not enumerated herein.

At Substep 2-3, it is determined whether the chromaticity ratio is smaller than a preset chromaticity ratio.

The preset chromaticity ratio is a critical value for determining whether the difference between the displayed chromaticity of the aperture region and the displayed chromaticity of the non-aperture region is obvious, and is affected by the type of the screen to be compensated and the pixel density. Therefore, the present disclosure is not limited thereto. It will be readily appreciated that if the chromaticity ratio is less than the preset chromaticity ratio, it may be considered that the chromaticity difference between the aperture region and the non-aperture region is not obvious, that is, the visual difference cannot be perceived by the naked eye. Therefore, it is not necessary to compensate the chromaticity data of the aperture region. If the chromaticity ratio is not less than the preset chromaticity ratio, it is considered that there is an obvious chromaticity difference between the aperture region and the non-aperture region, that is, the visual difference between the aperture region and the non-aperture region can be obviously perceived by the naked eye, so that the display data of the aperture region needs to be compensated.

At Sub step 2-4, if the chromaticity ratio is not less than the preset chromaticity ratio, a chromaticity compensation value is determined from the first chromaticity coordinate and the second chromaticity coordinate.

In some embodiments, Substep 2-4 may include:

Substep 2-4-1: calculating a first ratio of a second horizontal coordinate in the second chromaticity coordinate to a first horizontal coordinate in the first chromaticity coordinate, and performing a logarithmical calculation on the first ratio according to a preset logarithmic function to obtain a first chromaticity compensation value; and Substep 2-4-1: calculating a second ratio between a second vertical coordinate in the second chromaticity coordinate and a first vertical coordinate in the first chromaticity coordinate, and performing a logarithmical calculation on the second ratio according to a preset logarithmic function to obtain a second chromaticity compensation value.

The first chromaticity coordinate is (x1, y1), and the second chromaticity coordinate is (x2, y2). Therefore, the first ratio (x2/x1) of the second horizontal coordinate in the second chromaticity coordinate to the first horizontal coordinate in the first chromaticity coordinate is calculated, and then the logarithmical calculation is performed on the first ratio (x2/x1) according to a preset logarithmic function. The second ratio (y2/y1) between the second vertical coordinate in the second chromaticity coordinate and the first vertical coordinate in the first chromaticity coordinate, and then the logarithmical calculation is performed on the second ratio (y2/y1) according to a preset logarithmic function to obtain the first and second chromaticity compensation values. The first chromaticity compensation value is a compensation value for the green component in the image data, and the second chromaticity compensation value is a compensation value for the blue component in the image data.

It should be noted that Substep 2-4-1 and Substep 2-4-2 may be performed in parallel or sequentially, and this is not limited in the present disclosure.

In some embodiments, the method may further include: after step S104, performing screen display, that is, displaying contents in the screen, according to the compensation value, and returning to the Step S102 of obtaining the first display data of the aperture region and the second display data of the non-aperture region when the screen to be compensated is turned on, until the luminance ratio is less than the preset luminance ratio, and the chromaticity ratio is less than the preset chromaticity ratio.

Since the pixel difference between the aperture region and the non-aperture region is larger, the display difference is also larger. After one calculation, a certain display difference may still occur in the actual display. For better display effect, the screen display is performed according to the compensation value, and then Step S101 to Step S104 are repeated until the luminance ratio is smaller than the preset luminance ratio and the chromaticity ratio is smaller than the preset chromaticity ratio. In this way, the actual difference between the aperture region and the non-aperture region is small enough to be discernible to the naked eye during the actual display of the aperture region and the non-aperture region.

After the compensation value is calculated, the method may further include programming the compensation value in the screen to be compensated for being read by the terminal device and for screen display according to the compensation value.

As can be seen from the above, the method for determining compensation value for the local display region according to the present embodiment is applied to a terminal device equipped with a screen to be compensated. A screen to be compensated is turned on, and the screen to be compensated includes an aperture region and a non-aperture region. A first display data of the aperture region and a second display data of the non-aperture region when the screen to be compensated is turned on are obtained. Based on the first display data and the second display data, display ratio between the aperture region and the non-aperture region is determined. Based on the display ratio, a compensation value for performing display compensation on the aperture region is calculated. The compensation value for performing the display compensation on the aperture region is calculated, so that the aperture region may be used to display an image after compensated according to the compensation value during display of the aperture region, thereby reducing the display ratio between the aperture region and the non-aperture region, and improving the display effect.

Figure 3:
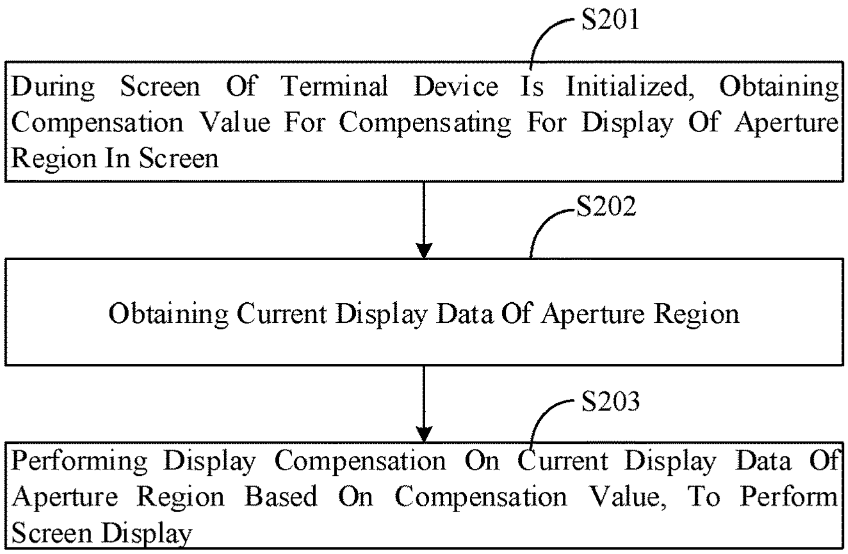
FIG. 3 is a flowchart of a screen displaying method according to an embodiment of the present disclosure.

The present disclosure further provides a screen display method applied to a terminal device. Referring to FIG. 3 showing a schematic flowchart of a screen display method according to an embodiment of the present disclosure. The screen display method includes Step S201 to Step S203.

At Step S201: when a screen of the terminal device is initialized, a compensation value for compensating for display of an aperture region in the screen is obtained.

When the terminal device is powered on, the terminal device needs to be initialized, and the compensation for display of the aperture region may be performed during the initialization process, to compensate for the display difference of the aperture region. In the present embodiment, the definition of the “aperture region” is the same as the definition of the aperture region 101 in the foregoing embodiments, and details are not described herein. Reference may be made to the related description of the foregoing embodiments.

Specifically, the compensation value may be calibrated before the terminal screen is shipped, and programmed in the screen of the terminal device.

In the present embodiment, a method for calculating the compensation value may include: turning on a screen to be compensated; obtaining a display data of the aperture region and a display data of the non-aperture region in the screen of the terminal device; determining display ratio between the aperture region and the non-aperture region based on the display data of the aperture region and the display data of the non-aperture region; and calculating a compensation value for performing display compensation on the aperture region, based on the display ratio between the aperture region and the non-aperture region. The definition of the "non-aperture region" is the same as the definition of the non-aperture region in the foregoing embodiments, and details are not described herein. Reference may be made to the related description of the foregoing embodiments.

Further, the obtaining of the display data of the aperture region and the display data of the non-aperture region in the screen of the terminal device may include: obtaining image data displayed in the aperture region and image data displayed in the non-aperture region, the image data being represented in the RGB color space, that is, represented by primary color components of red, green, or blue; and converting the image data in the RGB color space to display data in the Lxy color space or the Luv color space. Here, the display data in the Lxy color space includes luminance L and chromaticity coordinates (x, y).

Further, the calculating of the compensation value for performing display compensation on the aperture region based on the display ratio between the aperture region and the non-aperture region may include: calculating a ratio in the luminance L of the aperture region and the non-aperture region, and ratios in x value and y value in the chromaticity coordinates (x, y), respectively. If the ratios are larger, a luminance compensation value a, and a first chromaticity compensation value b for the x value and a second chromaticity compensation value c for the y value in the chromaticity coordinates (x, y) are obtained from the luminance L and the chromaticity coordinates (x, y).

The luminance compensation value a is a compensation value for the red component in the displayed image data, the first chromaticity compensation value b is a compensation value for the green component in the displayed image data, and the second chromaticity compensation value c is a compensation value for the blue component in the displayed image data.

At Step S202, current display data of the aperture region is obtained.

The current display data of the aperture region in Step S202 is image data in the RGB color space, i.e., represented by three primary color components of red, green, or blue.

At Step S203, display compensation is performed on the current display data of the aperture region according to the compensation value, to perform screen display.

For example, if the current display data of the aperture region is (R0, G0, BO) and the compensation values are a, b, c, the actual display data is (aR0, bG0, cBO).

In view of the above, the screen display method according to the present embodiment is applied to a terminal device. When a screen of the terminal device is initialized, a compensation value for compensating for display of an aperture region in the screen is obtained, current display data of the aperture region is obtained, and display compensation is performed on the current display data of the aperture region according to the compensation value, to perform screen display. Therefore, the display data of the aperture region is compensated to reduce the display difference between the aperture region and the non-aperture region, thereby improving the overall display effect.

In the method according to the above embodiment, the present embodiment will be further described with respect to the apparatus for determining compensation value for local display region, which may be embodied as a separate entity or may be integrated in a terminal device.

Figure 4:
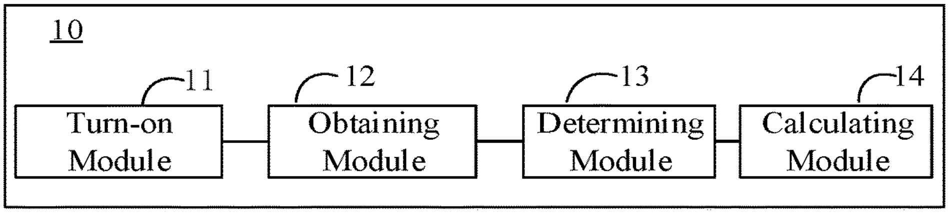
FIG. 4 is a block diagram of an apparatus for determining a compensation value for a local display region according to an embodiment of the present disclosure.

Referring to FIG. 4 showing an apparatus for determining a compensation value for a local display region according to an embodiment of the present disclosure. The apparatus for determining a compensation value for a local display region is applied to a terminal device in which a screen to be compensated is installed. The apparatus 10 for determining a compensation value for a local display region may include a turn-on module 11, an obtaining module 12, a determining module 13, and a calculating module 14. The details are described below.

(1) The Turn-on Module 11

The turn-on module 11 is configured to turn on a screen to be compensated, and the screen to be compensated includes an aperture region and a non-aperture region.

(2) The Obtaining Module 12

The obtaining module 12 is configured to obtain a first display data of the aperture region and a second display data of the non-aperture region when the screen to be compensated is turned on.

(3) The Determining Module 13

The determining module 13 is configured to determine display ratio between the aperture region and the non-aperture region based on the first display data and the second display data.

In some embodiments, the first display data includes a first luminance value and a first chromaticity coordinate, and the second display data includes a second luminance value and a second chromaticity coordinate. In an embodiment, the determining module 13 is configured to determine a luminance ratio of the non-aperture region to the aperture region when the screen to be compensated is turned on, based on the first luminance value and the second luminance value, and determine a chromaticity ratio of the non-aperture region to the aperture region when the screen to be compensated is turned on, based on the first chromaticity coordinate and the second chromaticity coordinate.

(4) The Calculating Module 14

The calculating module 14 is configured to calculate a compensation value for performing display compensation on the aperture region, based on the display ratio.

In some embodiments, the calculating module 14 is configured to: determine whether the luminance ratio is less than a preset luminance ratio; if the luminance ratio is not less than the preset luminance ratio, the luminance ratio is logarithmically calculated according to the preset logarithmic function to obtain a luminance compensation value; determine whether the chromaticity ratio is less than a preset chromaticity ratio; and if the chromaticity ratio is not less than the preset chromaticity ratio, a chromaticity compensation value is determined from the first chromaticity coordinate and the second chromaticity coordinate.

Further, the calculating module 14 is configured to: calculate a first ratio of the second horizontal coordinate in the second chromaticity coordinate to the first horizontal coordinate in the first chromaticity coordinate; performing a logarithmical calculation on the first ratio according to a preset logarithmic function to obtain a first chromaticity compensation value; calculate a second ratio between a second vertical coordinate in the second chromaticity coordinate and a first vertical coordinate in the first chromaticity coordinate, and performing a logarithmical calculation on the second ratio according to a preset logarithmic function to obtain a second chromaticity compensation value.

In some embodiments, the apparatus 10 for determining a compensation value for a local display region may further include a display module for performing screen display according to the compensation value, and returning to the obtaining module 12, the determining module 13 and the calculating module 14 to perform their respective functions until the luminance ratio is smaller than the preset luminance ratio and the chromaticity ratio is smaller than the preset chromaticity ratio.

As can be seen from the above, the apparatus for determining a compensation value for a local display region is applied to a terminal device in which a screen to be compensated is installed. The turn-on module 11 is configured to turn on a screen to be compensated, and the screen to be compensated includes an aperture region and a non-aperture region. The obtaining module 12 is configured to obtain a first display data of the aperture region and a second display data of the non-aperture region when the screen to be compensated is turned on. The determining module 13 is configured to determine display ratio between the aperture region and the non-aperture region based on the first display data and the second display data. The calculating module 14 is configured to calculate a compensation value for performing display compensation on the aperture region, based on the display ratio. Therefore, a compensation value for performing display compensation on the aperture region is calculated. The compensation value may be used for the aperture area to perform display after compensation according to the compensation value when the aperture area is displayed, thereby reducing the display ratio between the aperture area and the non-aperture area, and improving the display effect.

Figure 5:
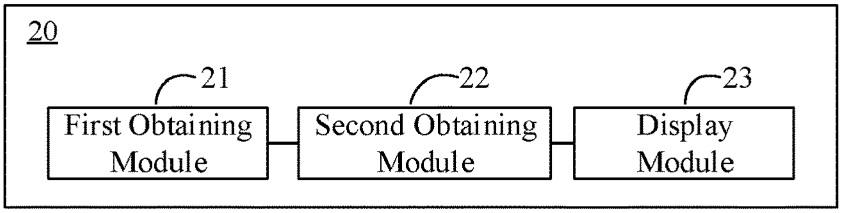
FIG. 5 is a block diagram of a screen displaying apparatus according to an embodiment of the present disclosure.

An embodiment of the present disclosure also provides a screen display device, applied to a terminal device. Referring to FIG. 5 showing a block diagram of a screen display apparatus according to an embodiment of the present disclosure. The screen display apparatus may include a first obtaining module 21, a second obtaining module 22, and a display module 23. The details are described below.

(1) The First Obtaining Module 21

The first obtaining module 21 is configured to obtain a compensation value for compensating for display of an aperture region in a screen of the terminal device when the screen of the terminal device is initialized.

(2) The Obtaining Module 22

The obtaining module 22 is configured to obtain current display data of the aperture region.

(3) The Display Module 23

The display module 23 is configured to perform display compensation on the current display data of the aperture region according to the compensation value, to perform screen display.

In view of the above, the screen display apparatus according to the present embodiment is applied to a terminal device. when a screen of the terminal device is initialized, a compensation value for compensating for display of an aperture region in the screen is obtained by the first obtaining module 21, current display data of the aperture region is obtained by the obtaining module 22, and display compensation is performed by the display module 23 on the current display data of the aperture region according to the compensation value, to perform screen display. Therefore, the display data of the aperture region is compensated to reduce the display difference between the aperture region and the non-aperture region, thereby improving the overall display effect.

Figure 6:
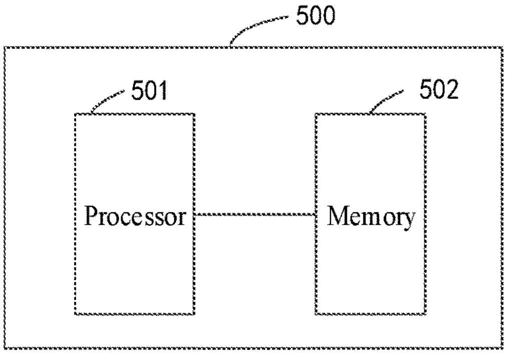
FIG. 6 is a block diagram of a terminal device according to a second embodiment of the present disclosure.

In addition, an embodiment of the present disclosure further provides a terminal device, which may be a smartphone, a tablet computer, or the like. As shown in FIG. 6, the terminal device 500 includes a processor 501 and a memory 502. The processor 501 is electrically connected to the memory 502.

The processor 501 is a control center of the terminal device 500, is connected to various parts of the entire terminal device by various interfaces and lines, and performs various functions and processes data of the terminal device by running or loading application programs stored in the memory 502, and invoking data stored in the memory 502, thereby monitoring the terminal device as a whole.

In the present embodiment, the processor 501 in the terminal device 500 loads instructions corresponding to the processes of one or more application programs into the memory 502, according to the following steps, and the application programs stored in the memory 502 are executed by the processor 501, thereby implementing various functions.

A screen to be compensated is turned on, and the screen to be compensated includes an aperture region and a non-aperture region. A first display data of the aperture region and a second display data of the non-aperture region when the screen to be compensated is turned on are obtained. Based on the first display data and the second display data, display ratio between the aperture region and the non-aperture region is determined. Based on the display ratio, a compensation value for performing display compensation on the aperture region is calculated. Alternatively, when a screen of the terminal device is initialized, a compensation value for compensating for display of an aperture region in the screen is obtained, current display data of the aperture region is obtained, and display compensation is performed on the current display data of the aperture region according to the compensation value, to perform screen display.

Figure 7:
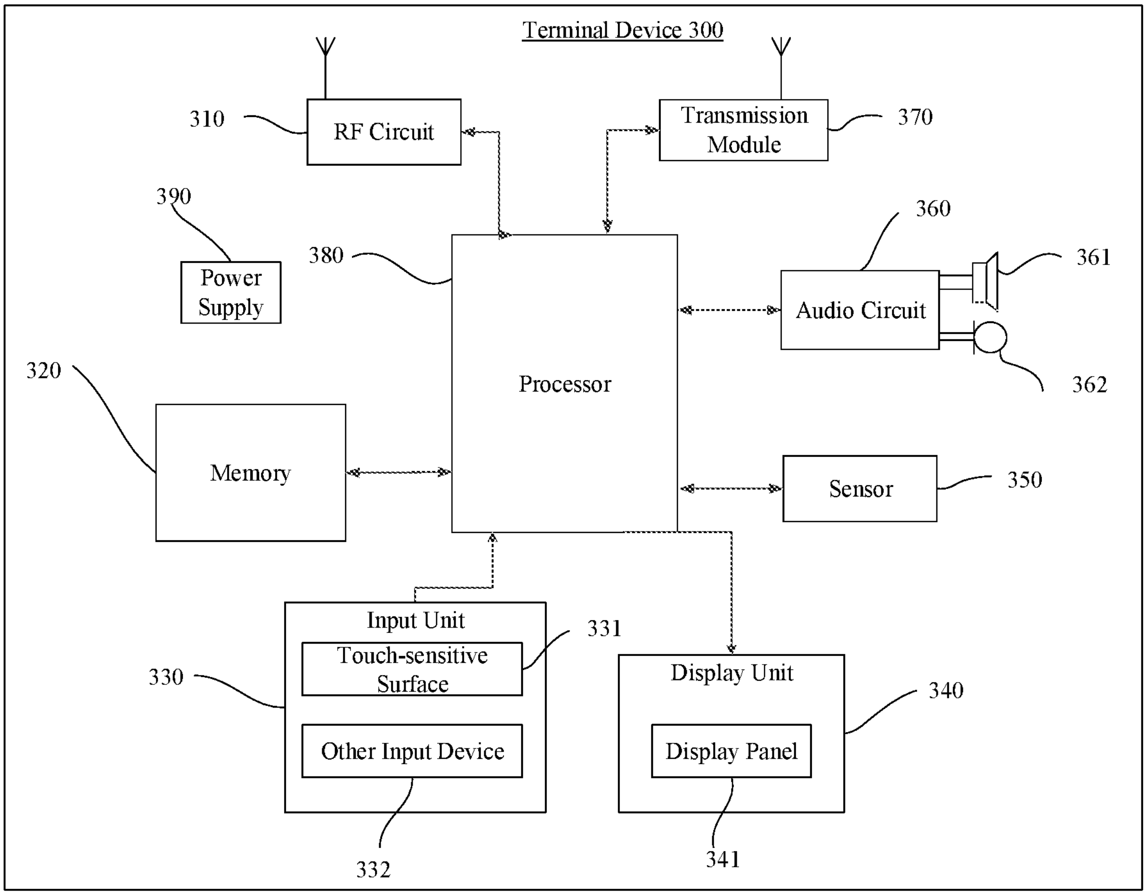
FIG. 7 is a block diagram of a terminal device according to a third embodiment of the present disclosure.

FIG. 7 is a block diagram of a terminal device according to an embodiment of the present disclosure. The terminal device may be used to implement the method for determining the compensation value for the local display region according to any of the above embodiments. The terminal device 300 may be a smartphone or a tablet computer.

The RF circuit 310 is configured to receive and transmit electromagnetic waves, to achieve interconversion of the electromagnetic waves and electrical signals, so as to communicate with a communication network or other devices. The RF circuit 310 may include various current circuit elements for performing these functions, such as an antenna, a radio frequency transceiver, a digital signal processor, an encryption/decryption chip, a subscriber identity module (SIM) card, a memory, or the like. The RF circuit 310 may communicate with various networks, such as the Internet, an intranet, or a wireless network, or with other devices via a wireless network. The wireless network described above may include a cellular telephone network, a wireless local area network, or a metropolitan area network. The wireless networks described above may use a variety of communication standards, protocols, and technologies, including, but not limited to, global system for mobile communication (GSM), enhanced data GSM environment (EDGE), wideband code division multiple access (WCDMA), code division access (CDMA), time division multiple access (TDMA), wireless fidelity (Wi-Fi) (such as the American Institute of Electrical and Electronics Engineers standards IEEE 802.11a, IEEE 802.11b, IEEE802.11g, and/or IEEE 802.11n), voice over internet protocol (VoIP), worldwide interoperability for microwave access (Wi-Max), other protocols for mail, instant messaging, or short messages, or any other suitable communication protocols, even those that have not yet been developed.

The memory 320 may be configured to store software programs and modules, such as the method for determining the compensation value for the local display region or program instructions/modules corresponding to the method according to any of the above-described embodiments. The processor 380 executes various functional applications and data processing by running the software programs and modules stored in the memory 320, that is, implements a communication data storage function. The memory 320 may include high speed random access memory, and may further include non-volatile memory, such as one or more magnetic disk storage apparatus, flash memory device, or other volatile solid state storage device. In some examples, the memory 320 may further include memory disposed remotely relative to the processor 380, the remote memory may be connected to the terminal device 300 via a network. Examples of such networks include, but are not limited to, the Internet, enterprise intranets, local area networks, mobile communication networks, or combinations thereof.

An input unit 330 is configured to receive input numeric or character information and generate keyboard, mouse, joystick, or optical or trackball signal inputs in relation to user settings and functional control. The input unit 330 may include a touch-sensitive surface 331 and other input devices 332. The touch-sensitive surface 331, also referred to as a touch display screen or touch pad, may collect a touch operation of a user thereon or in the vicinity of the touch-sensitive surface 331 (such as an operation of the user on or in the vicinity of the touch-sensitive surface 331 by using any suitable object or accessory such as a finger, a stylus or the like), and actuate a corresponding connection apparatus according to a preset program. Alternatively, the touch sensitive surface 331 may include a touch detection apparatus and a touch controller. The touch detection apparatus detects a touch orientation of the user, detects a signal due to the touch operation, and transmits the signal to the touch controller. The touch controller receives the touch information from the touch detection apparatus and converts it into contact coordinates, which are then sent to the processor 380, and may receive and execute commands from the processor 380. In addition, the touch-sensitive surface 331 may be implemented in various types such as a resistive type, a capacitive type, an infrared ray, or a surface acoustic wave. In addition to the touch-sensitive surface 331, the input unit 330 may further include other input devices 332. Other input devices 332 may include, but are not limited to, one or more of a physical keyboard, a function key (such as a volume control key, an on-off key, or the like), a trackball, a mouse, a joystick, or the like.

The display unit 340 may be used to display information input by or provided to the user and various graphical user interfaces of the terminal device 300, which may be composed of graphics, text, icons, videos, or any combination thereof. The display unit 340 may include a display panel 341. Alternatively, the display panel 341 may be configured in the form of a liquid crystal display (LCD), an organic light-emitting diode (OLED), or the like. Further, the touch-sensitive surface 331 may cover the display panel 341. When the touch-sensitive surface 331 detects a touch operation on or in the vicinity of the touch-sensitive surface 331, the touch-sensitive surface 331 transmits a signal to the processor 380 to determine a type of a touch event, and then the processor 380 provides a visual output on the display panel 341 according to the type of the touch event. Although in FIG. 7, the touch-sensitive surface 331 and the display panel 341 are implemented as two separate components to respectively implement input and output functions, in some embodiments, the touch-sensitive surface 331 and the display panel 341 may be integrated to implement input and output functions.

The terminal device 300 may further include at least one sensor 350, such as a light sensor, a motion sensor, and other sensors. The light sensor may include an ambient light sensor and a proximity sensor. The ambient light sensor may adjust the luminance of the display panel 341 according to luminance of the ambient light, and the proximity sensor may turn off the display panel 341 and/or backlight when the terminal device 300 moves close to the ear. As one of the motion sensors, the gravity acceleration sensor may detect magnitudes of an acceleration in various directions (generally, three axes), may detect a magnitude and a direction of a gravity when stationary, and may be used for applications for recognizing posture of the mobile phone (such as horizontal/vertical screen switching, related games, magnetometer attitude calibration) and vibration recognition related functions (such as pedometer and knocking). Other sensors, such as gyroscopes, barometers, hygrometers, thermometers, infrared sensors, or the like, which the terminal device 300 may also be configured, are not described herein.

An audio circuit 360, a speaker 361, and a microphone 362 may provide an audio interface between the user and the terminal device 300. The audio circuit 360 may transmit a received electrical signal converted from audio data to the loudspeaker 361. The loudspeaker 361 may convert the electrical signal into an audio signal for output. On the other hand, the microphone 362 converts the acquired audio signal into an electrical signal. The electrical signal is received by the audio circuit 360 and converted into audio data by the audio circuit 360. The audio data is then output to and processed by the processor 380, and then transmitted to, for example, another terminal via the RF circuit 310, or the audio data is output to the memory 320 for further processing. The audio circuit 360 may further include an earplug jack to provide communication between the peripheral headset and the terminal device 300.

The terminal device 300, may assist the user in receiving and transmitting email, browsing web pages, accessing streaming media, etc., via a transmission module 370 (e.g., a Wi-Fi module), which provides the user with wireless broadband Internet access. Although the transmission module 370 is shown in FIG. 7, it will be appreciated that it does not belong to an essential element of the terminal device 300, and may be omitted as necessary without changing the essence of the invention.

The processor 380 is a control center of the terminal device 300, is connected to various parts of an entire cellphone by various interfaces and lines, and performs various functions and processes data of the terminal device 300 by running or executing software programs and/or modules stored in the memory 320, and invoking data stored in the memory 320. Alternatively, the processor 380 may include one or more processing cores. In some embodiments, the processor 380 may be integrated with an application processor and a modem processor. The application processor mainly processes an operating system, a user interface, an application program, or the like. The modem processor mainly processes wireless communication. It will be appreciated that the above modem processor may also not be integrated into the processor 380.

The terminal device 300 further includes a power supply 390 (such as a battery) for supplying power to the respective components. In some embodiments, the power supply may be logically connected to the processor 380 through a power management system, so that functions such as charging, discharging, or power consumption management are managed through the power management system. The power supply 190 may further include one or more DC or AC power supplies, a recharging system, a power failure detection circuit, a power converter or inverter, a power status indicator, or any other component.

Although not shown, the terminal device 300 may further include a camera (such as a front-facing camera, or a rear-facing camera), a Bluetooth module, or the like, and details are not described herein. In the present embodiment, the display unit of the terminal device is a touch screen display, and the terminal device further includes a memory and one or more programs. The one or more programs are stored in the memory and configured to execute the one or more programs by the one or more processors. The one or more programs includes instructions for:

A screen to be compensated is turned on, and the screen to be compensated includes an aperture region and a non-aperture region. A first display data of the aperture region and a second display data of the non-aperture region when the screen to be compensated is turned on are obtained. Based on the first display data and the second display data, display ratio between the aperture region and the non-aperture region is determined. Based on the display ratio, a compensation value for performing display compensation on the aperture region is calculated.

Alternatively, the terminal device further includes a memory, and one or more programs stored in the memory and configured to be executed by the one or more processors to perform instructions for: obtaining a compensation value for compensating for display of an aperture region in a screen of the terminal device when the screen is initialized; obtaining current display data of the aperture region; and performing display compensation on the current display data of the aperture region according to the compensation value, to perform screen display.

In an implementation, each of the above modules may be implemented as an independent entity, or may be implemented in any combination as the same entity or several entities. For an implementation of each of the above modules, reference may be made to the foregoing method embodiments, and details are not described herein.

It will be appreciated by those of ordinary skill in the art that all or a portion of the steps of one of the various methods according to the above-described embodiments may be performed by instructions, which may be stored in a computer-readable storage medium and loaded and executed by a processor, or by relevant hardware controlled by the instructions. To this end, an embodiment of the present disclosure provides a storage medium including instructions executable by the terminal device. The instructions executable by the terminal device, when executed by the processor of the terminal device, perform the steps in the method for determining the compensation value for the local display region according to any of the embodiments of the present disclosure.

The computer-readable storage medium may include a read-only memory (ROM), a random access memory (RAM), a magnetic disk, an optical disk, or the like.

Since the instructions stored in the computer readable storage medium may perform the steps in any of the methods for determining the compensation value for the local display region according to embodiments of the present disclosure, the advantageous effects achieved in any of the methods for determining the compensation value for the local display region according to the embodiments of the present disclosure may be realized. For details, refer to the foregoing embodiments, and details are not described herein.

Reference may be made to the previous embodiments for a specific implementation of each of the above operations, and details are not described herein.

In sum, although the present disclosure has been disclosed in the above embodiments, the above embodiments are not intended to limit the present disclosure. Those skilled in the art may make various changes and modifications without departing from the spirit and scope of the present disclosure. Therefore, the scope of the present disclosure is subject to the scope defined in the claims.

What is claimed is:

1. A method for determining a compensation value for a local display region, applied to a terminal device comprising a screen to be compensated, comprising:

turning on the screen to be compensated, wherein the screen to be compensated comprises an aperture region and a non-aperture region;

obtaining a first display data of the aperture region and a second display data of the non-aperture region when the screen to be compensated is turned on, wherein the first display data comprises a first luminance value and a first chromaticity coordinate, and the second display data comprises a second luminance value and a second chromaticity coordinate;

determining a display ratio between the aperture region and the non-aperture region based on the first display data and the second display data; and calculating a compensation value for performing display compensation on the aperture region based on the display ratio, wherein the determining of the display ratio between the aperture region and the non-aperture region comprises:

based on the second luminance value and the first luminance value, determining, as the display ratio, a luminance ratio of the second luminance value of the non-aperture region to the first luminance value of the aperture region when the screen to be compensated is turned on; and based on the first chromaticity coordinate and the second chromaticity coordinate, determining, as the display ratio, a chromaticity ratio of the second chromaticity coordinate of the non-aperture region to the first chromaticity coordinate of the aperture region when the screen to be compensated is turned on.

2. The method of claim 1, wherein the calculating of the compensation value for performing display compensation on the aperture region comprises:

determining whether the luminance ratio is smaller than a preset luminance ratio;

in response to determining that the luminance ratio is more than or equal with the preset luminance ratio, performing a logarithmical calculation on the luminance ratio based on a preset logarithmic function, to obtain a luminance compensation value;

determining whether the chromaticity ratio is smaller than a preset chromaticity ratio; and in response to determining that the chromaticity ratio is more than or equal with the preset chromaticity ratio, determining a chromaticity compensation value based on the first chromaticity coordinate and the second chromaticity coordinate.

3. The method of claim 2, wherein the determining of the chromaticity compensation value comprises:

calculating a first ratio of a second horizontal coordinate in the second chromaticity coordinate to a first horizontal coordinate in the first chromaticity coordinate, and performing a logarithmical calculation on the first ratio based on a preset logarithmic function to obtain a first chromaticity compensation value; and calculating a second ratio between a second vertical coordinate in the second chromaticity coordinate and a first vertical coordinate in the first chromaticity coordinate, and performing a logarithmical calculation on the second ratio based on a preset logarithmic function, to obtain a second chromaticity compensation value.

4. The method of claim 2, further comprising: after calculating the compensation value for performing the display compensation on the aperture region based on the display ratio, performing screen display based on the compensation value, and returning to the obtaining of the first display data of the aperture region and the second display data of the non-aperture region during the screen to be compensated is turned on, until the luminance ratio is less than the preset luminance ratio, and the chromaticity ratio is less than the preset chromaticity ratio.

5. The method of claim 1, wherein the turning-on of the screen to be compensated comprises:

turning on the screen to be compensated, and displaying a same content in both the aperture region and the non-aperture region.

6. The method of claim 1, wherein the obtaining of the first display data of the aperture region and the second display data of the non-aperture region during the screen to be compensated is turned on comprises:

obtaining a first image data in the aperture region and a second image data in the non-aperture region during the screen to be compensated is turned on; and converting the first image data into the first display data in a preset color space, and converting the second image data into the second display data in the preset color space.

7. The method of claim 1, comprising: after calculating the compensation value for performing the display compensation on the aperture region, programming the compensation value in the screen to be compensated, for being read by the terminal device and for screen display based on the compensation value.

8. A screen display method, applied to a terminal device comprising a screen to be compensated, the screen display method comprising:

turning on the screen to be compensated, wherein the screen to be compensated comprises an aperture region and a non-aperture region;

obtaining a first display data of the aperture region and a second display data of the non-aperture region when the screen to be compensated is turned on, wherein the first display data comprises a first luminance value and a first chromaticity coordinate, and the second display data comprises a second luminance value and a second chromaticity coordinate;

determining display ratio between the aperture region and the non-aperture region, based on the first display data and the second display data;

calculating a compensation value for performing display compensation on the aperture region based on the display ratio;

when the screen of the terminal device is initialized, obtaining the compensation value for compensating for display of the aperture region in the screen; and obtaining current display data of the aperture region; and performing display compensation on the current display data of the aperture region based on the compensation value, to perform screen display, wherein the determining of the display ratio between the aperture region and the non-aperture region comprises:

based on the second luminance value and the first luminance value, determining, as the display ratio, a luminance ratio of the second luminance value of the non-aperture region to the first luminance value of the aperture region when the screen to be compensated is turned on; and based on the first chromaticity coordinate and the second chromaticity coordinate, determining, as the display ratio, a chromaticity ratio of the second chromaticity coordinate of the non-aperture region to the first chromaticity coordinate of the aperture region when the screen to be compensated is turned on.

9. The screen display method of claim 8, wherein the calculating of the compensation value for performing display compensation on the aperture region comprises:

determining whether the luminance ratio is smaller than a preset luminance ratio;

in response to determining that the luminance ratio is more than or equal with the preset luminance ratio, performing a logarithmical calculation on the luminance ratio based on a preset logarithmic function, to obtain a luminance compensation value;

determining whether the chromaticity ratio is smaller than a preset chromaticity ratio; and in response to determining that the chromaticity ratio is more than or equal with the preset chromaticity ratio, determining a chromaticity compensation value based on the first chromaticity coordinate and the second chromaticity coordinate.

10. The screen display method of claim 9, wherein the determining of the chromaticity compensation value comprises:

calculating a first ratio of a second horizontal coordinate in the second chromaticity coordinate to a first horizontal coordinate in the first chromaticity coordinate, and performing a logarithmical calculation on the first ratio based on a preset logarithmic function to obtain a first chromaticity compensation value; and calculating a second ratio between a second vertical coordinate in the second chromaticity coordinate and a first vertical coordinate in the first chromaticity coordinate, and performing a logarithmical calculation on the second ratio based on a preset logarithmic function, to obtain a second chromaticity compensation value.

11. The screen display method of claim 9, further comprising: after calculating the compensation value for performing the display compensation on the aperture region based on the display ratio, performing screen display based on the compensation value, and returning to the obtaining of the first display data of the aperture region and the second display data of the non-aperture region during the screen to be compensated is turned on, until the luminance ratio is less than the preset luminance ratio, and the chromaticity ratio is less than the preset chromaticity ratio.

12. A terminal device, comprising a processor and a memory electrically connected to the processor and storing thereon an instruction and data executable by the processor to perform operations comprising: turning on the screen to be compensated, wherein the screen to be compensated comprises an aperture region and a non-aperture region; obtaining a first display data of the aperture region and a second display data of the non-aperture region when the screen to be compensated is turned on, wherein the first display data comprises a first luminance value and a first chromaticity coordinate, and the second display data comprises a second luminance value and a second chromaticity coordinate; determining display ratio between the aperture region and the non-aperture region, based on the first display data and the second display data; and calculating a compensation value for performing display compensation on the aperture region based on the display ratio, wherein the determining of the display ratio between the aperture region and the non-aperture region comprises:

based on the second luminance value and the first luminance value, determining, as the display ratio, a luminance ratio of the second luminance value of the non-aperture region to the first luminance value of the aperture region when the screen to be compensated is turned on; and based on the first chromaticity coordinate and the second chromaticity coordinate, determining, as the display ratio, a chromaticity ratio of the second chromaticity coordinate of the non-aperture region to the first chromaticity coordinate of the aperture region when the screen to be compensated is turned on.

13. The terminal device of claim 12, wherein the processor is further configured to perform operations comprising:

determining whether the luminance ratio is smaller than a preset luminance ratio;

in response to determining that the luminance ratio is more than or equal with the preset luminance ratio, performing a logarithmical calculation on the luminance ratio based on a preset logarithmic function, to obtain a luminance compensation value;

determining whether the chromaticity ratio is smaller than a preset chromaticity ratio; and in response to determining that the chromaticity ratio is more than or equal with the preset chromaticity ratio, determining a chromaticity compensation value based on the first chromaticity coordinate and the second chromaticity coordinate.

14. The terminal device of claim 13, wherein the processor is further configured to perform operations comprising:

calculating a first ratio of a second horizontal coordinate in the second chromaticity coordinate to a first horizontal coordinate in the first chromaticity coordinate, and performing a logarithmical calculation on the first ratio based on a preset logarithmic function to obtain a first chromaticity compensation value; and calculating a second ratio between a second vertical coordinate in the second chromaticity coordinate and a first vertical coordinate in the first chromaticity coordinate, and performing a logarithmical calculation on the second ratio based on a preset logarithmic function, to obtain a second chromaticity compensation value.

15. The terminal device of claim 13, wherein the processor is further configured to perform operations comprising:

after calculating the compensation value for performing the display compensation on the aperture region based on the display ratio, performing screen display based on the compensation value, and returning to the obtaining of the first display data of the aperture region and the second display data of the non-aperture region during the screen to be compensated is turned on, until the luminance ratio is less than the preset luminance ratio, and the chromaticity ratio is less than the preset chromaticity ratio.

* * * * *